United States Patent
Yin et al.

(10) Patent No.: US 10,156,489 B2
(45) Date of Patent: Dec. 18, 2018

(54) PIEZORESISTIVE PRESSURE SENSOR

(71) Applicant: Asia Pacific Microsystems, Inc., Hsinchu (TW)

(72) Inventors: Hung-Lin Yin, Hsinchu (TW); Cheng-Yi Chiang, Hsinchu (TW); Yu-Che Huang, Hsinchu (TW)

(73) Assignee: ASIA PACIFIC MICROSYSTEMS, INC., Hsinchu (TW)

( * ) Notice: Subject to any disclaimer, the term of this patent is extended or adjusted under 35 U.S.C. 154(b) by 164 days.

(21) Appl. No.: 15/414,956

(22) Filed: Jan. 25, 2017

(65) Prior Publication Data
US 2017/0219449 A1 Aug. 3, 2017

(30) Foreign Application Priority Data
Feb. 2, 2016 (TW) .............................. 105103218 A

(51) Int. Cl.
*G01L 9/00* (2006.01)
*G01L 9/06* (2006.01)

(52) U.S. Cl.
CPC .......... *G01L 9/0044* (2013.01); *G01L 9/0047* (2013.01); *G01L 9/06* (2013.01)

(58) Field of Classification Search
CPC ....... G01L 9/00; G01L 9/0044; G01L 9/0047; G01L 9/06
See application file for complete search history.

(56) References Cited

U.S. PATENT DOCUMENTS

| 5,257,546 | A | * | 11/1993 | Tobita | ................... G01L 19/146 338/4 |
| 6,959,608 | B2 | | 11/2005 | Bly et al. | |
| 8,866,241 | B2 | | 10/2014 | Gaynor | |
| 2012/0125113 | A1 | * | 5/2012 | Liu | ........................ G01L 9/0054 73/721 |

FOREIGN PATENT DOCUMENTS

| GB | 2034970 A | * | 6/1980 | ........... G01L 9/0054 |
| JP | 2013195097 A | * | 9/2013 | ............... G01L 9/00 |
| JP | 2014070962 A | * | 4/2014 | ............... G01L 9/00 |

* cited by examiner

Primary Examiner — Nguyen Q. Ha
(74) Attorney, Agent, or Firm — Chen-Chi Lin

(57) ABSTRACT

A piezoresistive pressure sensor includes a substrate and a silicon device layer. The substrate has a cavity. The silicon device layer includes a diaphragm and a support element. A top surface of the diaphragm is connected to a top surface of the support element by one or more side surfaces. A recess of the silicon device layer is defined by the top surface of the diaphragm and the one or more side surfaces. A plurality of piezoresistive regions are on the top surface of the diaphragm, on the one or more side surfaces and on the top surface of the support element. A plurality of conductive regions are on the top surface of the support element. The plurality of conductive regions do not extend to the top surface of the diaphragm. The plurality of piezoresistive regions have a first ion dosage concentration. The plurality of conductive regions have a second ion dosage concentration. The second ion dosage concentration is greater than the first ion dosage concentration.

19 Claims, 4 Drawing Sheets

PIEZORESISTIVE PRESSURE SENSOR

PRIORITY TO A FOREIGN APPLICATION

The applicant claims priority to a foreign application, TW105103218.

FIELD OF THE INVENTION

This invention relates generally to a piezoresistive pressure sensor. More particularly, the present invention relates to a miniature piezoresistive pressure sensor having ion implanted regions.

BACKGROUND OF THE INVENTION

Fabrication of a pressure sensor uses ion implantation technology to form piezoresistive elements and highly doped conductive elements in a silicon layer. The piezoresistive elements are for stress sensing and the highly doped conductive elements are for reducing a conduct resistance between a metal layer and the silicon layer. A size of the pressure sensor is critical in applications including cardiovascular pressure measurements. Design of the pressure sensor requires consideration of trade-offs for reducing the size of the pressure sensor. A first preference is to have a thin membrane or diaphragm (for example, 3 microns thick or less) to increase the sensor output sensitivity. A second preference is to have a thick membrane or diaphragm (for example, 5 microns thick or more) to prevent leakage caused by a deep junction depth formed by a high dosage ion implantation (for example, greater than 1020 ions/cm3). The first preference contradicts the second preference. A first solution is to use a thick membrane with reduced sensor output sensitivity. A second solution is to use a thin membrane and to add doped poly-silicon or Epi-polysilicon on the thin membrane to form strain gauges. For example, U.S. Pat. No. 6,959,608 to Bly et al. discloses a pressure sensor having a one micron thick pressure sensing membrane and less than 0.1 micron thick piezoresistive strain gauges. A film stress however may be induced from the added poly-silicon or Epi-polysilicon. Therefore, to achieve both sensor output sensitivity and to reduce leakage, a third solution includes using a thin membrane and applying different ion implantation dosages on different pre-determined regions.

SUMMARY OF THE INVENTION

A piezoresistive pressure sensor is disclosed. The piezoresistive pressure sensor includes a substrate and a silicon device layer. The substrate has a cavity. The silicon device layer includes a diaphragm and a support element. A top surface of the diaphragm is connected to a top surface of the support element by one or more side surfaces. A recess of the silicon device layer is defined by the top surface of the diaphragm and the one or more side surfaces. A plurality of piezoresistive regions are on the top surface of the diaphragm, extending to the one or more side surfaces and further extending to the top surface of the support element. A plurality of conductive regions are on the top surface of the support element. The plurality of conductive regions do not extend to the top surface of the diaphragm. The plurality of piezoresistive regions have a first ion dosage concentration. The plurality of conductive regions have a second ion dosage concentration. The second ion dosage concentration is greater than the first ion dosage concentration.

The present disclosure has advantages over conventional techniques of fabricating piezoresistive pressure sensors. The present disclosure does not require a thick diaphragm by trading-off sensor output sensitivity. The present disclosure does not require to add doped poly-silicon or Epi-polysilicon on the diaphragm to form strain gauges.

DETAILED DESCRIPTION OF THE INVENTION

Figure 1:
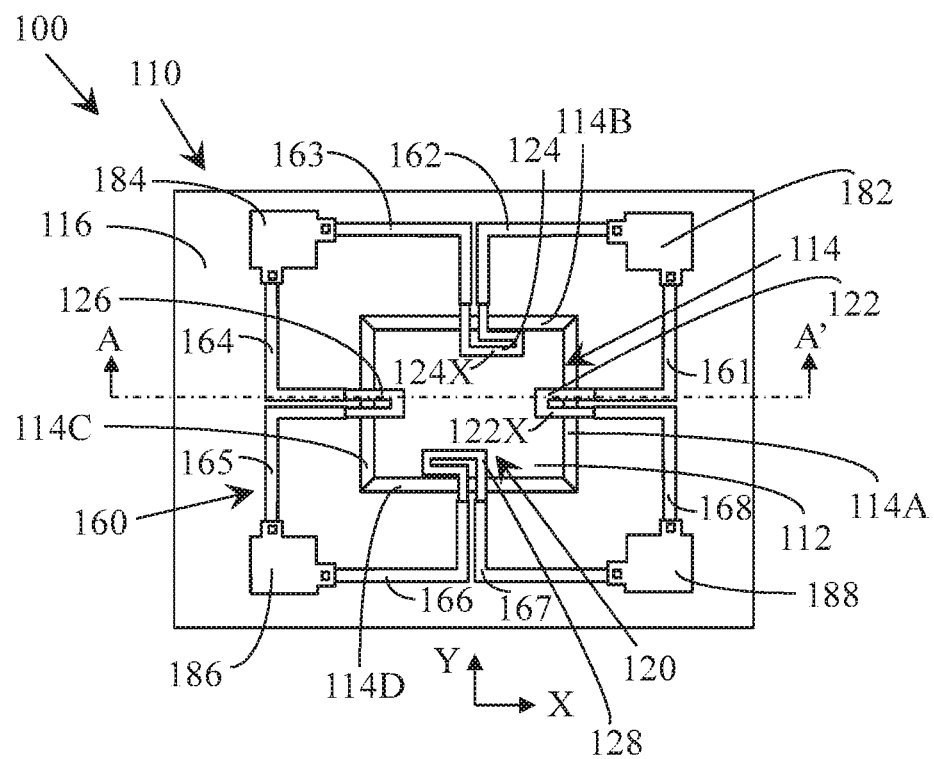
FIG. 1 is a top view of a piezoresistive pressure sensor in examples of the present disclosure.
Figure 2:
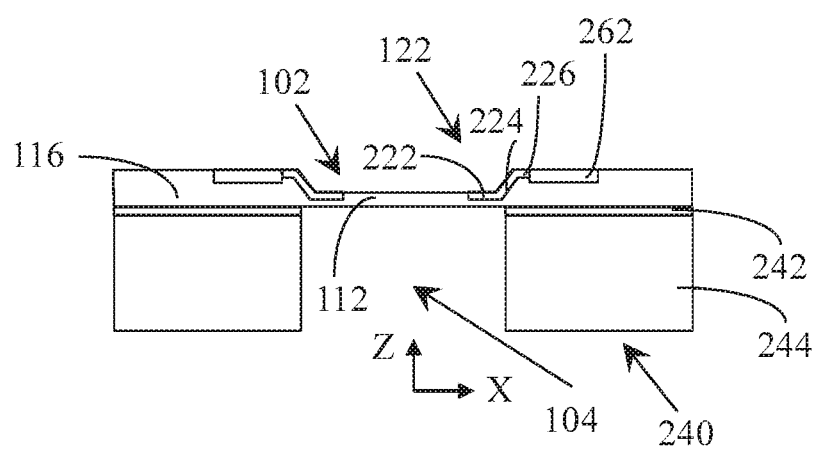
FIG. 2 is a cross-sectional view perpendicular to AA' plane of the piezoresistive pressure sensor of FIG. 1 in examples of the present disclosure.

FIG. 1 is a top view of a piezoresistive pressure sensor 100 in examples of the present disclosure. FIG. 2 is a cross-sectional view perpendicular to AA' plane of the piezoresistive pressure sensor 100 of FIG. 1 in examples of the present disclosure. The piezoresistive pressure sensor 100 includes a substrate 240 and a silicon device layer 110. In examples of the present disclosure, the silicon device layer 110 is directly attached to the substrate 240. In examples of the present disclosure, the substrate 240 includes an insulation layer 242 and a silicon layer 244. The silicon device layer 110 is directly attached to the insulation layer 242 of the substrate 240.

The substrate 240 has a cavity 104. The silicon device layer includes a diaphragm 112 and a support element 116. A top surface of the diaphragm 112 is connected to a top surface of the support element 116 by one or more side surfaces 114. In one example, the top surface of the diaphragm 112 is of a rectangular shape. A length of one of the two opposite short sides is smaller than or equal to 150 micrometers. The one or more side surfaces 114 include four side surfaces 114A, 114B, 114C and 114D. In another example, the top surface of another diaphragm is of an oval shape. The one or more side surfaces include only one perimeter side surface. A recess 102 of the silicon device layer 110 is defined by the top surface of the diaphragm 112 and the one or more side surfaces 114. In examples of the present disclosure, a centroid of the recess 102 of the silicon device layer 110 and a centroid of the cavity 104 of the substrate 240 are aligned in a direction parallel to Z-axis.

In examples of the present disclosure, an angle between the one or more side surfaces 114 and the top surface of the diaphragm 112 is greater than ninety degrees. The recess 102 of the silicon device layer 110 is of a trapezoidal prism shape having a top and bottom surfaces. The top and bottom surfaces of the trapezoidal prism shape are perpendicular to Z-axis. An area of the top surface of the trapezoidal prism shape is greater than an area of the bottom surface of the trapezoidal prism shape. The area of the bottom surface of the trapezoidal prism shape equals an area of the top surface of the diaphragm 112.

In examples of the present disclosure, a thickness of the diaphragm 112 is smaller than a thickness of the support element 116. The thickness of the diaphragm 112 is less than or equal to five micrometers. The thickness of the support element is greater than or equal to five micrometers.

In examples of the present disclosure, the recess 102 is formed by etching the silicon device layer 110 by potassium hydroxide (KOH) or Tetramethylammonium hydroxide (TMAH). The cavity 104 is formed by etching the substrate 240 by KOH (a wet process) or a deep reactive ion etching (DRIE, a dry process). An area of a bottom surface of the recess 102 is smaller than an area of a top surface of the cavity 104 of the substrate 240. In examples of the present disclosure, a deformable region of the diaphragm 112 is defined by the bottom surface of the recess 102. In examples of the present disclosure, the cavity 104 is a through hole through the substrate 240. Therefore, a pressure of the cavity 104 is the same as an ambient pressure or an environmental pressure.

A plurality of piezoresistive regions 120 are on the top surface of the diaphragm 112, on the one or more side surfaces 114 and on the top surface of the support element 116. In examples of the present disclosure, each of the plurality of piezoresistive regions 120 extends from the top surface of the diaphragm 112 through a respective side surface of the one or more side surfaces 114 to the top surface of the support element 116. In examples of the present disclosure, the plurality of piezoresistive regions 120 includes four piezoresistive regions 122, 124, 126 and 128. The piezoresistive region 122 has two horizontal sections (parallel to X-axis) and one lateral section (parallel to Y-axis). The horizontal section 122X of the piezoresistive region 122 extends from the top surface of the diaphragm 112 through the side surface 114A of the one or more side surfaces 114 to the top surface of the support element 116. The horizontal section 122X (used for stress sensing) of the piezoresistive region 122 is longer than the lateral section of the piezoresistive region 122. A shorter lateral section is designed to reduce noise. Two lateral sections of the piezoresistive region 124 extend from the top surface of the diaphragm 112 through the side surface 114B of the one or more side surfaces 114 to the top surface of the support element 116. A horizontal section 124X (used for stress sensing) of the piezoresistive region 124 is connected to the lateral sections of the piezoresistive region 124. In examples of the present disclosure, the top surface of the diaphragm 112 and the plurality of piezoresistive regions 120 form a rotational symmetry of order 2. The (X,Y) coordinate of a centroid of the piezoresistive region 124 and the piezoresistive region 128 is the same as the (X,Y) coordinate of a centroid of the top surface of the diaphragm 112. The piezoresistive region 124 and the piezoresistive region 128 are not symmetric with respect to the XZ-plane.

A plurality of conductive regions 160 are on the top surface of the support element 116. The plurality of conductive regions 160 do not extend to the one or more side surfaces 114. The plurality of conductive regions 160 have higher ion dosage concentration than that of the plurality of piezoresistive regions 120. To prevent leakage, the plurality of conductive regions 160 do not extend to the top surface of the diaphragm 112 and only on the top surface of the support element 116. In examples of the present disclosure, the plurality of conductive regions 160 have eight conductive regions 161, 162, 163, 164, 165, 166, 167 and 168. In examples of the present disclosure, a first end of the piezoresistive region 122 is connected to the conductive region 168. A second end of the piezoresistive region 122 is connected to the conductive region 161. A first end of the piezoresistive region 124 is connected to the conductive region 162. A second end of the piezoresistive region 124 is connected to the conductive region 163. A first end of the piezoresistive region 126 is connected to the conductive region 164. A second end of the piezoresistive region 126 is connected to the conductive region 165. A first end of the piezoresistive region 128 is connected to the conductive region 166. A second end of the piezoresistive region 128 is connected to the conductive region 167. In examples of the present disclosure, the conductive region 161 has a horizontal section 262 and a lateral section. One horizontal section of the piezoresistive region 122 has a first portion 222, a second portion 224 and a third portion 226. The first portion 222 is on the top surface of the diaphragm 112. The second portion 224 is on the side surface 114A. The third portion 226 is on the top surface of the support element 116. The horizontal section 262 of the conductive region 161 is connected to the third portion 226 of one horizontal section of the piezoresistive region 122.

In examples of the present disclosure, the plurality of piezoresistive regions 120 have a first ion dosage concentration. The plurality of conductive regions 160 have a second ion dosage concentration. The first ion dosage concentration is in a range from $10^{18}$ ions/cm$^3$ to $10^{20}$ ions/cm$^3$. The second ion dosage concentration is in a range from $10^{20}$ ions/cm$^3$ to $10^{22}$ ions/cm$^3$. The second ion dosage concentration is greater than the first ion dosage concentration. In examples of the present disclosure, the first ion dosage concentration and the second ion dosage concentration include P-type ions. In examples of the present disclosure, the first ion dosage concentration and the second ion dosage concentration include boron ions.

In examples of the present disclosure, four metal welding pads 182, 184, 186 and 188 are shown in FIG. 1 The conductive region 161 and the conductive region 162 are connected to the metal welding pad 182. In one example, the conductive region 161 and the conductive region 162 are directly connected to the metal welding pad 182. In another example, the conductive region 161 and the conductive region 162 are connected to the metal welding pad 182 through one or more conductive layers. The conductive region 163 and the conductive region 164 are connected to the metal welding pad 184. The conductive region 165 and the conductive region 166 are connected to the metal welding pad 186. The conductive region 167 and the conductive region 168 are connected to the metal welding pad 188. In examples of the present disclosure, the plurality of piezoresistive regions 120, the plurality of conductive regions 160 and the plurality of metal welding pads 182, 184, 186 and 188 form a Wheatstone bridge. The higher dosage concentrations of the plurality of conductive regions 160 can reduce the contact resistance between the metal pads and the plurality of piezoresistive regions 120.

Figure 3:
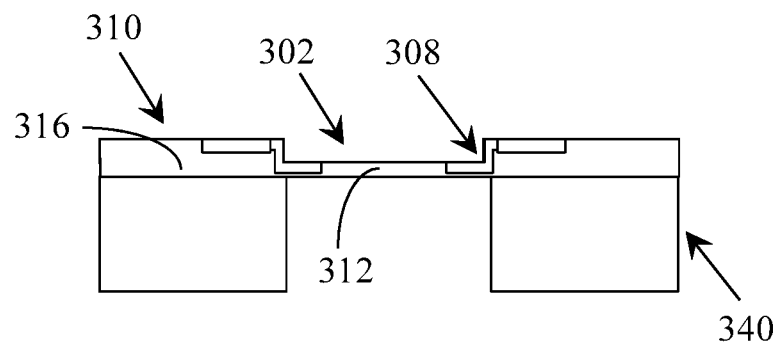
FIG. 3 is a cross-sectional view of another piezoresistive pressure sensor in examples of the present disclosure.

FIG. 3 is a cross-sectional view of a piezoresistive pressure sensor in examples of the present disclosure. The piezoresistive pressure sensor includes a substrate 340 and a silicon device layer 310. In examples of the present disclosure, the silicon device layer 310 is directly attached to the substrate 340. In examples of the present disclosure, the substrate 340 is made of a silicon material. The substrate 340 does not include an insulation layer. The silicon device layer 310 includes a diaphragm 312 and a support element 316. A top surface of the diaphragm 312 is connected to a top surface of the support element 316 by one or more side surfaces. A recess 302 of the silicon device layer 310 is defined by the top surface of the diaphragm 312 and the one or more side surfaces. In examples of the present disclosure, an angle 308 between the one or more side surfaces and the top surface of the diaphragm 312 is ninety degrees. A dry etching process can make the recess 302 with the angle 308 of about ninety degrees (for example, in a range from eighty-seven degrees to ninety-two degrees). Both implantation and diffusion technology can be used to form the plurality of piezoresistive regions 120 extending to the one or more side surfaces having the angle 308 of about ninety degrees (for example, in a range from eighty-seven degrees to ninety-two degrees).

Figure 4:
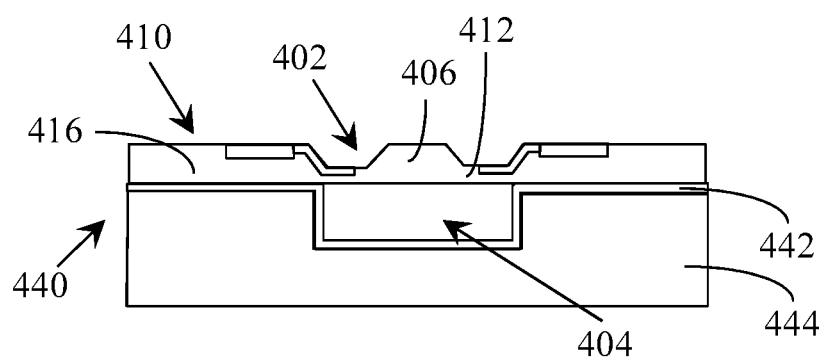
FIG. 4 is a cross-sectional view of still another piezoresistive pressure sensor in examples of the present disclosure.

FIG. 4 is a cross-sectional view of a piezoresistive pressure sensor in examples of the present disclosure. The piezoresistive pressure sensor includes a substrate 440 and a silicon device layer 410. In examples of the present disclosure, the silicon device layer 410 is directly attached to the substrate 440. In examples of the present disclosure, the substrate 440 includes an insulation layer 442 and a silicon layer 444. The silicon device layer 410 is directly attached to the insulation layer 442 of the substrate 440.

The substrate 440 has a cavity 404. The silicon device layer 410 includes a diaphragm 412 and a support element 416. A top surface of the diaphragm 412 is connected to a top surface of the support element 416 by one or more side surfaces. A recess 402 of the silicon device layer 410 is defined by the top surface of the diaphragm 412 and the one or more side surfaces. In examples of the present disclosure, the cavity 404 of the substrate 440 is a closed space. The cavity 404 of the substrate 440 is defined by a bottom surface of the diaphragm 412 and the insulation layer 442 of the substrate 440. In examples of the present disclosure, a lumped mass 406 is directly attached to the top surface of the diaphragm 412 to achieve a better linearity of a deformation of the diaphragm 412. In examples of the present disclosure, a top surface of the lumped mass 406 and a top surface of the support element 416 are co-planar. Therefore, one less etching process in the fabrication process is required.

Figure 5:
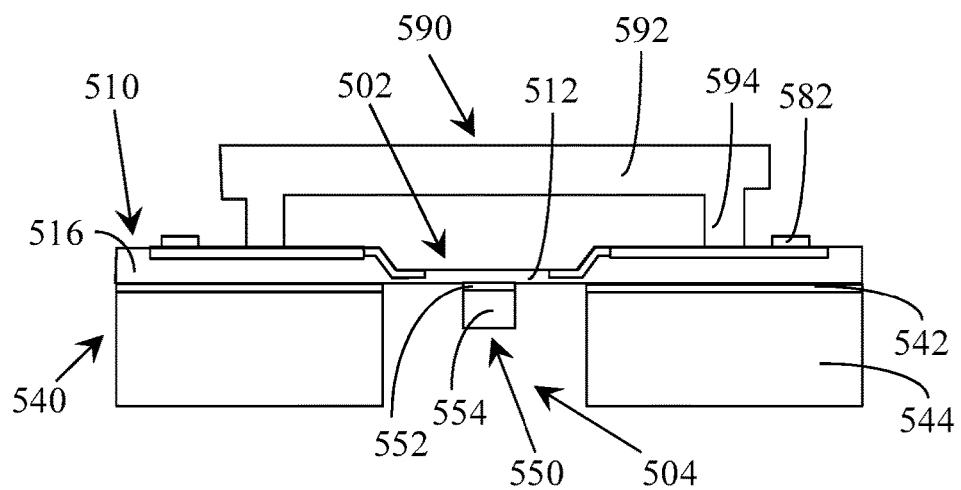
FIG. 5 is a cross-sectional view of yet another piezoresistive pressure sensor in examples of the present disclosure.

FIG. 5 is a cross-sectional view of a piezoresistive pressure sensor in examples of the present disclosure. The piezoresistive pressure sensor includes a substrate 540 and a silicon device layer 510. In examples of the present disclosure, the silicon device layer 510 is directly attached to the substrate 540. In examples of the present disclosure, the substrate 540 includes an insulation layer 542 and a silicon layer 544. The silicon device layer 510 is directly attached to the insulation layer 542 of the substrate 540.

The substrate 540 has a cavity 504. The silicon device layer 510 includes a diaphragm 512 and a support element 516. A plurality of metal welding pads 582 are on the support element 516 of the silicon device layer 510. A top surface of the diaphragm 512 is connected to a top surface of the support element 516 by one or more side surfaces. A recess of the silicon device layer 510 is defined by the top surface of the diaphragm 512 and the one or more side surfaces. In examples of the present disclosure, a lumped mass 550 is directly attached to a bottom surface of the diaphragm 512 to achieve a better linearity of a deformation of the diaphragm 512. In examples of the present disclosure, the lumped mass 550 has an insulation layer 552 and a silicon layer 554.

In examples of the present disclosure, the piezoresistive pressure sensor further includes a protective cover 590. The protective cover 590 has a horizontal portion 592 and a vertical portion 594. The horizontal portion 592 of the protective cover 590 is opposite to the diaphragm 512. The vertical portion 594 of the protective cover 590 is attached to the support element 516 of the silicon device layer 510. In examples of the present disclosure, film stacks are formed on a top surface of the support element 516. The vertical portion 594 of the protective cover 590 is attached to a selected film of the film stacks. The horizontal portion 592, the vertical portion 594 and the silicon device layer 510 define an enclosed cavity 502 above the diaphragm 512 and the plurality of piezoresistive regions. In one example, the enclosed cavity 502 is non-hermetic sealed. In another example, the enclosed cavity 502 is hermetic sealed.

Figure 6:
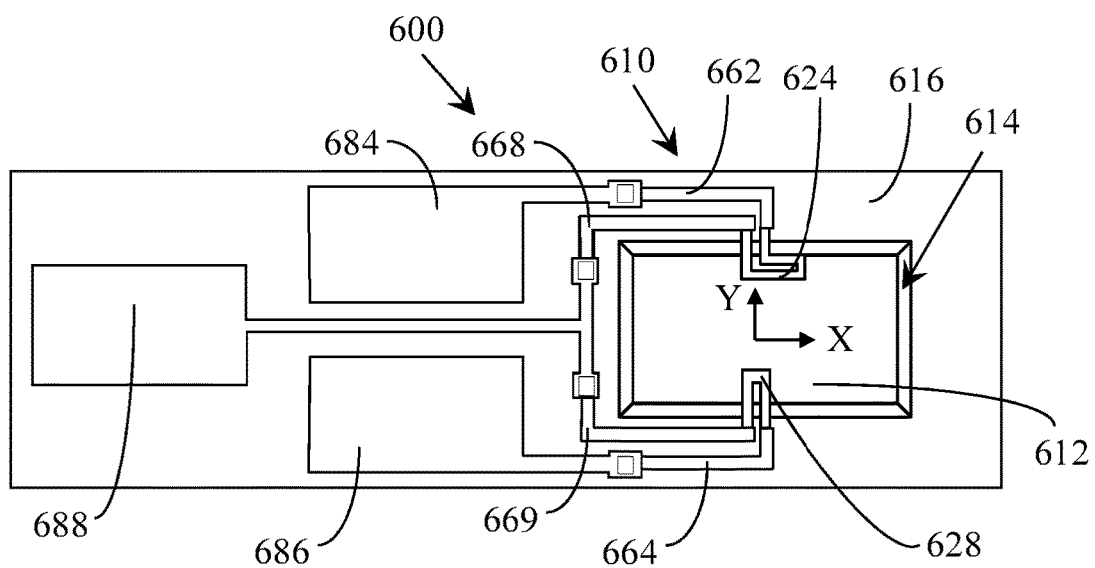
FIG. 6 is a top view of a Wheatstone half-bridge type piezoresistive pressure sensor in examples of the present disclosure.

FIG. 6 is a top view of a Wheatstone half-bridge type piezoresistive pressure sensor 600 in examples of the present disclosure. The piezoresistive pressure sensor 600 includes a substrate and a silicon device layer 610. In examples of the present disclosure, the silicon device layer 610 is directly attached to the substrate. The silicon device layer 610 includes a diaphragm 612 and a support element 616. A top surface of the diaphragm 612 is connected to a top surface of the support element 616 by one or more side surfaces 614. In one example, the top surface of the diaphragm 612 is of a rectangular shape. The one or more side surfaces 614 include four side surfaces. A first piezoresistive region 624 and a second piezoresistive region 628 are on the top surface of the diaphragm 612, on the one or more side surfaces 614 and on the top surface of the support element 616. A horizontal section (parallel to X-axis) of the first piezoresistive region 624 is longer than a lateral section (parallel to Y-axis) of the first piezoresistive region 624 on the diaphragm 612. A horizontal section of the second piezoresistive region 628 is shorter than a lateral section of the second piezoresistive region 628 on the diaphragm 612. A first end of the first piezoresistive region 624 is connected to a conductive region 668. A second end of the first piezoresistive region 624 is connected to a conductive region 662. A first end of the second piezoresistive region 628 is connected to a conductive region 669. A second end of the second piezoresistive region 628 is connected to a conductive region 664. The conductive region 662 is connected to a metal welding pad 684. The conductive region 664 is connected to a metal welding pad 686. The conductive region 668 is connected to a metal welding pad 688. The first and second piezoresistive regions 624 and 628, the conductive regions 662, 664, 668 and 669 and the metal welding pads 684, 686 and 688 form a Wheatstone half-bridge.

Figure 7:
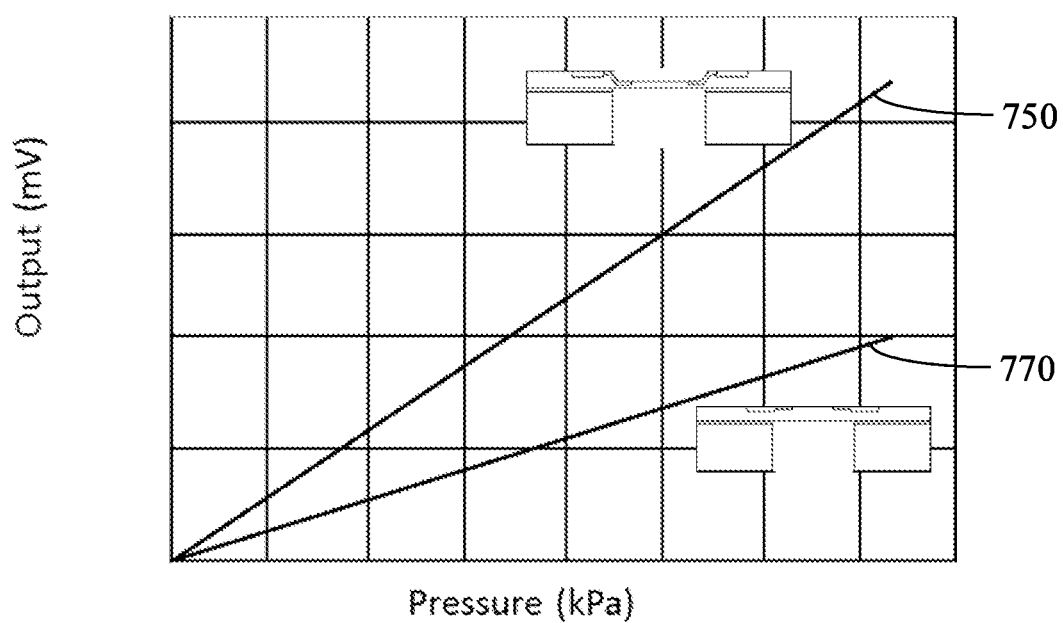
FIG. 7 is an output voltage versus pressure plot in examples of the present disclosure.

FIG. 7 is an output voltage versus pressure plot in examples of the present disclosure. Line 750 is for a piezoresistive pressure sensor having a recess above a diaphragm. Line 770 is for a piezoresistive pressure sensor not having a recess above a diaphragm. The diaphragm of line 750 is thinner than the diaphragm of line 770. Line 750 has a larger slope. Line 750 gives better sensitivity.

Those of ordinary skill in the art may recognize that modifications of the embodiments disclosed herein are possible. For example, the number of conductive regions on the top surface of the support element may vary. Other modifications may occur to those of ordinary skill in this art, and all such modifications are deemed to fall within the purview of the present invention, as defined by the claims.

The invention claimed is:

1. A piezoresistive pressure sensor comprising
a substrate having a cavity;
a silicon device layer attached to the substrate, the silicon device layer having a recess, the silicon device layer comprising
a diaphragm having a top surface; and a support element having a top surface;
the top surface of the diaphragm being connected to the top surface of the support element by one or more side surfaces;
the recess of the silicon device layer being defined by the top surface of the diaphragm and the one or more side surfaces;
each of a plurality of piezoresistive regions being on the top surface of the diaphragm, extending to a respective side surface of the one or more side surfaces and further extending to the top surface of the support element; and
a plurality of conductive regions being on the top surface of the support element, the plurality of conductive regions not extending to the one or more side surfaces nor the top surface of the diaphragm;
wherein said each of the plurality of piezoresistive regions is connected to two respective conductive regions of the plurality of conductive regions;
wherein the plurality of piezoresistive regions have a first ion dosage concentration;
wherein the plurality of conductive regions have a second ion dosage concentration; and
wherein the second ion dosage concentration is greater than the first ion dosage concentration.

2. The piezoresistive pressure sensor of claim 1, wherein a centroid of the recess of the silicon device layer and a centroid of the cavity of the substrate are aligned in a first direction parallel to a normal direction of the top surface of the diaphragm.

3. The piezoresistive pressure sensor of claim 2, wherein the recess of the silicon device layer is of a trapezoidal prism shape having a top and bottom surfaces perpendicular to the first direction; wherein an area of the top surface of the trapezoidal prism shape is greater than an area of the bottom surface of the trapezoidal prism shape; and wherein the area of the bottom surface of the trapezoidal prism shape equals an area of the top surface of the diaphragm.

4. The piezoresistive pressure sensor of claim 1, wherein the one or more side surfaces are perpendicular to the top surface of the diaphragm.

5. The piezoresistive pressure sensor of claim 1, wherein an angle between the one or more side surfaces and the top surface of the diaphragm is greater than ninety degrees.

6. The piezoresistive pressure sensor of claim 1, wherein a thickness of the diaphragm is smaller than a thickness of the support element; wherein the thickness of the diaphragm is less than or equal to five micrometers; and wherein the thickness of the support element is greater than or equal to five micrometers.

7. The piezoresistive pressure sensor of claim 1, wherein an area of the top surface of the diaphragm is smaller than an area of a top surface of the cavity of the substrate.

8. The piezoresistive pressure sensor of claim 1, wherein the first ion dosage concentration is in a range from $10^{18}$ ions/cm$^3$ to $10^{20}$ ions/cm$^3$.

9. The piezoresistive pressure sensor of claim 1, wherein the second ion dosage concentration is in a range from $10^{20}$ ions/cm$^3$ to $10^{22}$ ions/cm$^3$.

10. The piezoresistive pressure sensor of claim 1, wherein the cavity of the substrate is a through hole.

11. The piezoresistive pressure sensor of claim 1, wherein the cavity of the substrate is a closed space.

12. The piezoresistive pressure sensor of claim 1, wherein the top surface of the diaphragm is of a rectangular shape having two opposite long sides and two opposite short sides and wherein a length of one of the two opposite short sides is smaller than or equal to 150 micrometers.

13. The piezoresistive pressure sensor of claim 1 further comprising a protective cover having
a horizontal portion opposite the diaphragm; and
a vertical portion attached to the support element of the silicon device layer;
wherein the horizontal portion, the vertical portion and the silicon device layer define an enclosed cavity above the diaphragm and the plurality of piezoresistive regions.

14. The piezoresistive pressure sensor of claim 1 further comprising a lumped mass at a center of the top surface of the diaphragm or at a center of a bottom surface of the diaphragm.

15. The piezoresistive pressure sensor of claim 1, wherein each of the plurality of conductive regions is attached to a respective metal welding pad of a plurality of metal welding pads.

16. The piezoresistive pressure sensor of claim 15, wherein the plurality of piezoresistive regions, the plurality of conductive regions and the plurality of metal welding pads form a Wheatstone bridge.

17. The piezoresistive pressure sensor of claim 15, wherein the plurality of piezoresistive regions, the plurality of conductive regions and the plurality of metal welding pads form a Wheatstone half-bridge.

18. The piezoresistive pressure sensor of claim 1, wherein the substrate comprises an insulation layer and a silicon layer; wherein the silicon device layer is directly attached to the insulation layer of the substrate; and wherein the insulation layer of the substrate is directly attached to the silicon layer of the substrate.

19. The piezoresistive pressure sensor of claim 1, wherein the top surface of the diaphragm and the plurality of piezoresistive regions form a rotational symmetry of order 2.

* * * * *